United States Patent [19]

Monteith

[11] Patent Number: 5,158,061
[45] Date of Patent: Oct. 27, 1992

[54] EXHAUST GAS RECIRCULATION SUPPLY TUBE FOR AUTOMOTIVE ENGINE

[75] Inventor: Donald A. Monteith, Charlevoix, Mich.

[73] Assignee: Ford Motor Company, Dearborn, Mich.

[21] Appl. No.: 799,796

[22] Filed: Nov. 29, 1991

[51] Int. Cl.⁵ .................. F02M 25/07; F16L 55/00
[52] U.S. Cl. .................. 123/568; 285/187; 285/231; 285/299; 277/207 A
[58] Field of Search ............. 123/568, 569, 570, 571; 277/207 A; 285/53, 54, 187, 223, 226, 231, 910, 299

[56] References Cited

U.S. PATENT DOCUMENTS

| | | | |
|---|---|---|---|
| 3,369,829 | 2/1968 | Hopkins | 285/299 X |
| 4,171,689 | 10/1979 | Eheim | 123/568 |
| 4,613,170 | 9/1986 | Kersting | 285/187 |
| 4,659,117 | 4/1987 | Holzhausen et al. | 285/299 X |
| 4,747,624 | 5/1988 | Faber et al. | 285/187 |
| 4,792,161 | 12/1988 | Usui | 285/231 X |
| 4,969,445 | 11/1990 | Hertweck et al. | 123/569 |

FOREIGN PATENT DOCUMENTS 2856450 4/1980 Fed. Rep. of Germany ...... 285/231
0436961 12/1974 U.S.S.R. ........................... 285/187

Primary Examiner—Willis R. Wolfe
Attorney, Agent, or Firm—Jerome R. Drouillard; Roger L. May

[57] ABSTRACT

An exhaust gas recirculation supply tube for an automotive engine includes an inlet tube with a first end adapted for connection with a source of exhaust gas from an engine and a second end having one portion of a telescoping joint, and an outlet tube with a first end adapted for connection with an exhaust gas recirculation control and a second end having a telescoping joint portion slidingly engaged with the telescoping joint portion of the inlet tube. A gas sealing member extends about the telescoping joint portions of the inlet and outlet tubes.

4 Claims, 1 Drawing Sheet

EXHAUST GAS RECIRCULATION SUPPLY TUBE FOR AUTOMOTIVE ENGINE

BACKGROUND OF THE INVENTION

1. Field of the Invention

This invention relates to a tubular structure for conveying recirculated exhaust gas from a source of gas, such as the exhaust manifold, to a control element, such as an EGR valve.

2. Disclosure Information

Exhaust gas recirculation ("EGR") systems have been in use for many years. The purpose of such systems is to convey a small portion of the exhaust gas leaving the engine to the inlet manifold. The recirculated exhaust gas aids in the control of oxides of nitrogen, and also helps to reduce the octane requirement of the engine.

EGR supply tubes form an integral part of any EGR system. The purpose of the supply tube is to bring the recirculated exhaust gas from a source of exhaust gas, such as an exhaust manifold, to the EGR control element, such as an EGR valve. Such an EGR tube operates in a difficult environment, because the tube may be surrounded initially by sub-zero air and may be heated to 1200 F. or even higher by the exhaust gases passing therethrough. Moreover, this heating process, followed by cooling, is repeated every time the engine is shut down and allowed to cool to ambient temperature.

The large temperature excursions imposed on EGR tubes have caused designers to construct these tubes with bellows-like sections to accommodate the pronounced, thermally-induced, axial growth experienced with such tubes. Such bellows structures have not generally proven to be satisfactory because the high temperature of the exhaust gases moving through the EGR tube, coupled with the agitation provided by the interior surface of the convoluted walls of the bellows, have caused considerable heating of the bellows structure. This has proved to be unfortunate because stainless steels have generally been necessary to avoid corrosion resulting from hostile exhaust gases, and high temperature grain migration of the nickel portion of the stainless steel has caused embrittlement and subsequent failure of the bellows structure. In this regard, it is well to keep in mind that the environment that the EGR tube encounters is further rendered hostile by the high vibration forces associated with components bolted to internal combustion engines.

U.S. Pat. No. 4,171,689 to Eheim, and U.S. Pat. No. 4,969,445 to Hertweck et al. disclose bellows structures for handling exhaust gases. Neither of the structures disclosed in the '689 and '445 patents obviate the problems associated with prior art EGR supply tube bellows devices.

It is an object of the present invention to provide an EGR supply tube which accommodates axial growth of the tube due to heating without the problems associated with prior art bellows constructions.

It is an advantage of the present invention that an EGR tube according to this invention will be robust in terms of its ability to withstand the adverse environment to which it must operate.

Other objects, features and advantages of the present invention will be apparent to the reader of this specification.

DETAILED DESCRIPTION OF THE PREFERRED EMBODIMENT

Figure 1:
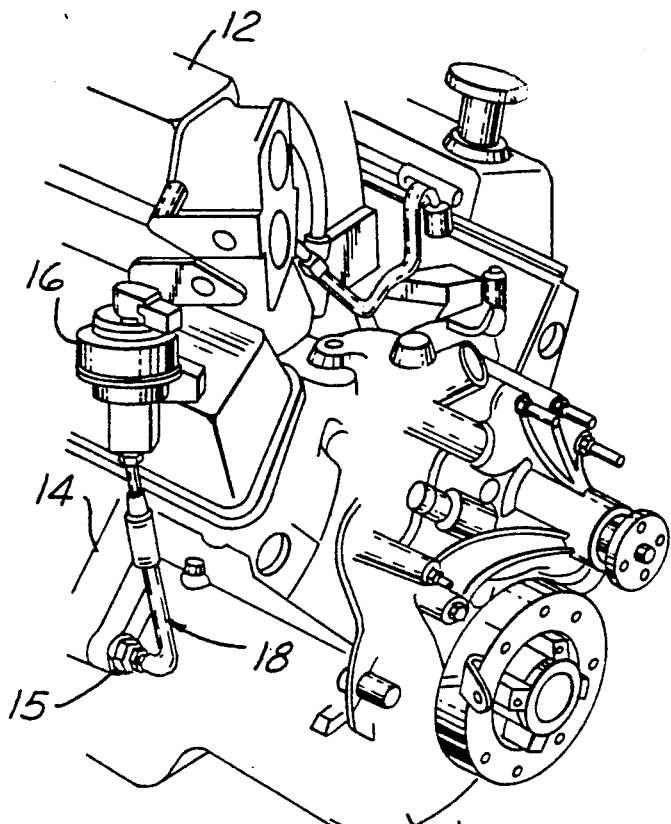
FIG. 1 is a perspective view of an automotive engine having an exhaust gas recirculation system including an EGR supply tube according to the present invention.

As shown in FIG. 1, an automotive type internal combustion engine, 10, is equipped as an intake manifold, 12, which not only admits air and fuel into the engine cylinders, but also recirculated exhaust gas. The recirculated exhaust gas is admitted to intake manifold 12 via an EGR valve, 16, which receives exhaust gas furnished by an EGR supply tube, 18. An exhaust manifold, 14, has a tap, 15, to which the inlet tube portion of EGR supply tube 18 is connected. Thus, it is readily apparent from FIG. 1 that EGR supply supply tube 18 extends between a source of exhaust gas at exhaust manifold 14 and an exhaust gas recirculation control, in this case, EGR valve 16. Because EGR supply tube 18 has considerable axial length, the tube will, due to thermal expansion, be subjected to considerable stress unless provision is made to accommodate the axial growth of the tube. A tube according to the present invention is intended to accommodate such growth without compromising the integrity of the tube. It should be understood in this regard that if the supply tube develops a leak, objectionable exhaust noises and exhaust gas may emanate from the leaking portion of the tube.

Figure 2:
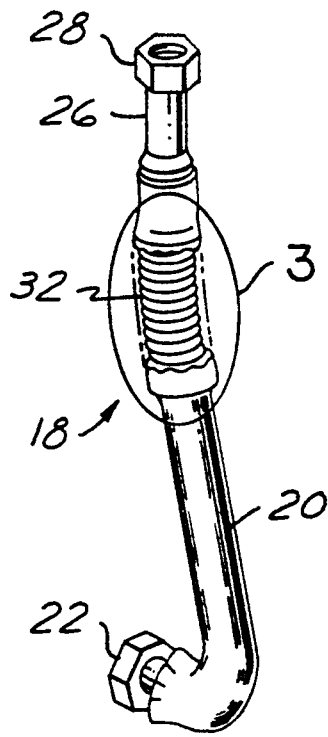
FIG. 2 is a perspective view of an EGR supply tube according to the present invention.

FIG. 2 illustrates an enlarged view of the EGR supply tube shown in FIG. 1. An inlet tube, 20, has a first end, 22, which is intended to be connected with a source of exhaust gas, such as exhaust manifold tap 15 of FIG. 1. Accordingly, first end 22 is shown with a conventional type of screw connector. Those skilled in the art will appreciate in view of this disclosure that a variety of connectors could be used at either end of supply tube 18 for the purpose of providing a gas tight, mechanically reliable, seal for attaching supply tube 18 between a source of exhaust gas and an EGR control such as EGR valve 16.

As is further shown in FIG. 2, an EGR supply tube as claimed in the present invention includes an outlet tube, 26 having a first end, 28, adapted for connection with an EGR control, such as EGR valve 16.

Figure 3:
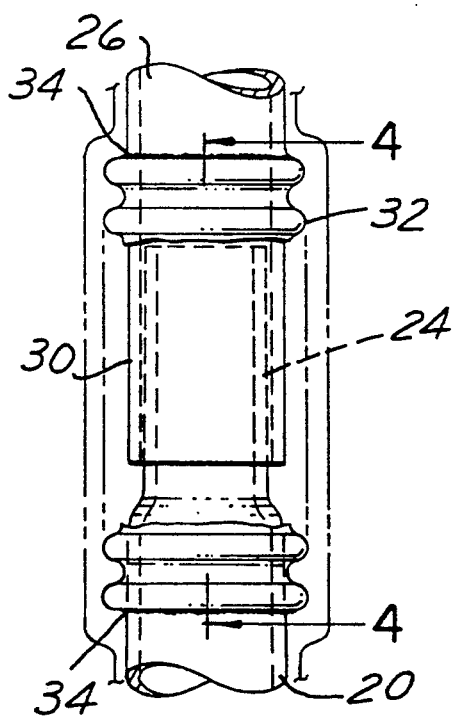
FIG. 3 is an enlarged section of the tube of FIG. 2 taken inside the region 3, as shown in FIG. 2.

FIG. 3 illustrates a partially broken away section through bellows 32 which forms part of the joint between inlet tube 20 and outlet tube 26 of EGR supply tube 18. Accordingly, second end 24 of inlet tube 20 comprises a telescoping joint portion which is slidingly engaged with second end 30 of outlet tube 26. Note that the telescoping section comprised of second ends 24 and 30, as well as gas sealing member 32, which extends about telescoping joint portions 24 and 30, allows axial motion of EGR supply tube 18.

Figure 4:
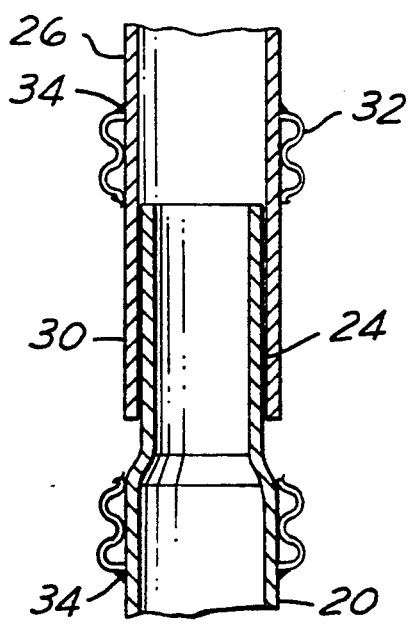
FIG. 4 is a sectional view of an expansion area of an EGR supply tube according to the present invention, taken along the line 4–4 of FIG. 3.

Further details of the axially expansible joint construction are shown in FIG. 4. As seen in FIG. 4, telescoping joint portions 24 and 30 of inlet tube 20 and outlet tube 26, respectively, allow axial growth of EGR supply tube 18, but without compromising the gas sealing ability of gas sealing member 32. Gas sealing member 32 is shown in the various figures as a convoluted tube, which is generally coaxial with the axis of the telescoping joint portions 24 and 30. Together, the telescoping joint portions and gas sealing member 32 seal exhaust gases from escaping the EGR supply tube while allowing axial growth of the supply tube. Importantly, telescoping joint portions 24 and 30 protect gas sealing member 32 from excessive heat contained in the flowing exhaust gas. In so doing, the embrittlement which might otherwise cause gas sealing member 32 to fail prematurely is avoided.

The convolutions in gas sealing member 32 allow the member to accommodate axial growth of EGR supply tube 18 while maintaining a gas-tight seal between inlet tube 20 and outlet tube 26. The gas-tight seal is assured by welds 34, which are imposed at either end of gas sealing member 32. Those skilled in the art will appreciate in view of this disclosure that telescoping joint portion comprising sections 24 and 30 of the inlet and outlet tubes may be fitted loosely enough to allow the tubes to telescope, but with sufficient tightness that gas sealing member 32 will be protected from failure due to bending. This is another important aspect of the present invention. It has been determined that prior art EGR supply tubes using only a bellows section between the inlet and outlet tubes frequently failed due to excessive bending imposed on gas sealing member 32 or any other type of bellows, while the EGR tube was being handled before and during installation of the tube on an engine. The telescoping joint portions of inlet tube 20 and outlet tube 26 prevent this excessive bending, as well as protecting the gas sealing member from excessive heat.

While the best mode for carrying out the invention has been described in detail, those familiar with the arts to which this invention relates will recognize alternative designs and embodiments for practicing the invention. Thus, the above-described preferred embodiment is intended to be illustrative of the invention, which may be modified within the scope of the following claims.

I claim:

1. An exhaust gas recirculation supply tube for an automotive engine, comprising:
    an inlet tube with a first end adapted for connection with a source of exhaust gas from an engine and a second end having one portion of a telescoping joint;
    an outlet tube with a first end adapted for connection with an exhaust gas recirculation control and a second end having a telescoping joint portion slidingly engaged with the telescoping joint portion of said inlet tube; and
    a gas sealing member extending about the telescoping joint portions of said inlet and outlet tubes.

2. An exhaust gas recirculation supply tube according to claim 1, wherein said gas sealing member is axially compliant.

3. An exhaust gas recirculation supply tube according to claim 2, wherein said gas sealing member comprises a convoluted tube which is generally coaxial with the axis of the telescoping joint portions of said inlet and outlet tubes.

4. An exhaust gas recirculation supply tube for an automotive engine, comprising:
    an inlet tube with a first end connected to a source of exhaust gas from said engine and a second end having one portion of a telescoping joint;
    an outlet tube with a first end connected to an exhaust gas recirculation valve and a second end having a telescoping joint portion slidingly engaged with the telescoping joint portion of said inlet tube; and
    an axially compliant gas sealing member extending about the telescoping joint portions of said inlet and outlet tubes, with said gas sealing member comprising a convoluted tube which is generally coaxial with the axis of the telescoping joint portions of said inlet and outlet tubes.

* * * * *